United States Patent [19]

Lee

[11] Patent Number: 5,653,365
[45] Date of Patent: Aug. 5, 1997

[54] SUPPORTING BRACKET OF LOCK FOR BICYCLE

[75] Inventor: Chi-Hou Lee, Taipei, Taiwan

[73] Assignee: Simple Locksmith Co., Ltd., Taipei, Taiwan

[21] Appl. No.: 662,140

[22] Filed: Jun. 12, 1996

[51] Int. Cl.⁶ .................................................. B60R 7/00
[52] U.S. Cl. .................. 224/448; 224/445; 224/459; 224/458; 224/935; 70/233
[58] Field of Search .................. 224/935, 459, 224/458, 39 F, 461, 462, 425, 445, 447, 448; 70/233; 248/218.4, 229.16, 222.11, 224.7, 225.11

[56] References Cited

U.S. PATENT DOCUMENTS 5,076,526  12/1991  Zane et al. ............................. 224/425
5,333,476  8/1994  Byrd, Jr. ................................. 70/233
5,458,308  10/1995  Lin ........................................ 224/935

*Primary Examiner*—Henry J. Recla
*Assistant Examiner*—Kam R. Shah
*Attorney, Agent, or Firm*—Beveridge, DeGrandi, Weilacher & Young LLP

[57] ABSTRACT

A supporting bracket includes a bracket body which defines a tube receiving portion and lock receiving portion. The tube receiving portion includes a split socket having a bush therein. The socket further includes a split threaded extension which receives a locking knob to tighten the split socket. An adaptor and a biasing block is further received by the locking block. When the locking knob is screwed in, the adaptor and biasing block are moved in to press against the bush. Accordingly, the supporting bracket can be firmly attached to the tube with different diameter of the bicycle. The lock can be readily held by the lock receiving portion when the lock is not in use.

3 Claims, 5 Drawing Sheets

SUPPORTING BRACKET OF LOCK FOR BICYCLE

BACKGROUND OF THE INVENTION

This invention relates to a supporting bracket, more particularly, to a supporting bracket of lock for a bicycle. This supporting bracket features a ready installation to the fork tube of the bicycle manually without any special tool. Accordingly, the lock can be readily locked as well as stored when not in use.

When a rider is parking his/her lovely bicycle, he/she is most concerned with the theft. In general, the bicycle is equipped with an U-type lock which can be attached to the front or rear wheel to block the bicycle from riding. If the U-type lock is not released, the wheel of bicycle is prevented from running, the theft can be prevented to a certain degree. Normally, a bracket is enclosed with the lock and said bracket can be fixed to the bicycle for holding the lock while not in use. The conventional bracket generally includes two sheet member which can sandwich the tube of the bicycle with a pair of bolts and nuts. Since bolt and nut are used in installation of this bracket, the screw driver and socket spanner must be used to drive the bolt and nut. It is really inconvenient to the rider to prepare those tools. If these special tool is enclosed with the lock, the retailer will provide another set of package which contains bolt and nut as well as screw driver and socket spanner. This will no doubt bring inconvenience to the retailer, the selling will be impaired accordingly.

SUMMARY OF THE INVENTION

It is the object of this invention to provide a supporting bracket of lock for the bicycle which can completely solve the problem which the conventional bracket meets.

It is still the object of this invention to provide a supporting bracket of lock for the bicycle wherein the bracket can be readily attached to the tube for the bicycle manually without special tools.

In order to achieve the object set forth, the supporting bracket includes a bracket body which defines a tube receiving portion and lock receiving portion. The tube receiving portion includes a split socket having a bush therein. Said socket further includes a split threaded extension which receives a locking knob to tighten the split socket. Accordingly, when the locking knob is screwed in, the inner diameter of the split socket will be narrowed to press said bush against the tube of the bicycle enclosed therein. As a result, the supporting bracket can be readily fixed to the tube of the bicycle manually without applying any special tool.

In the preferred embodiment of the present invention, a pushing block is provided within said locking knob, when said locking knob is screwed in, said pushing block will be pushed to against said bush disposed within said split socket. Accordingly, the supporting bracket can be firmly fixed to the tube of the bicycle.

In the preferred embodiment of the present invention, a lock receiving portion is provided for holding the lock when not in use.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of supporting bracket of lock for bicycle, wherein.

DETAILED DESCRIPTION OF PREFERRED EMBODIMENT

Figure 1:
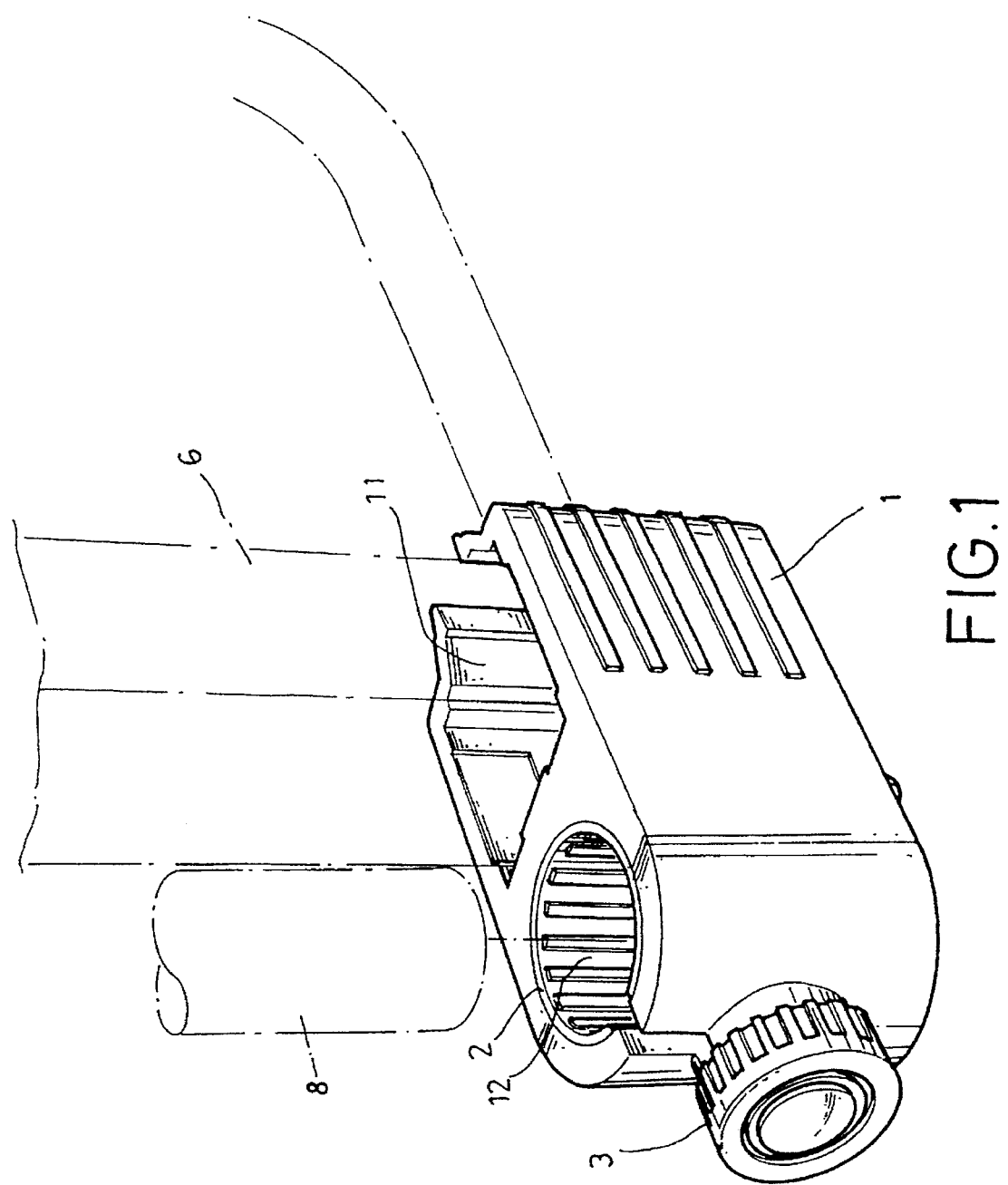
FIG. 1 is a perspective view of the supporting bracket made according to the present invention.
Figure 2:
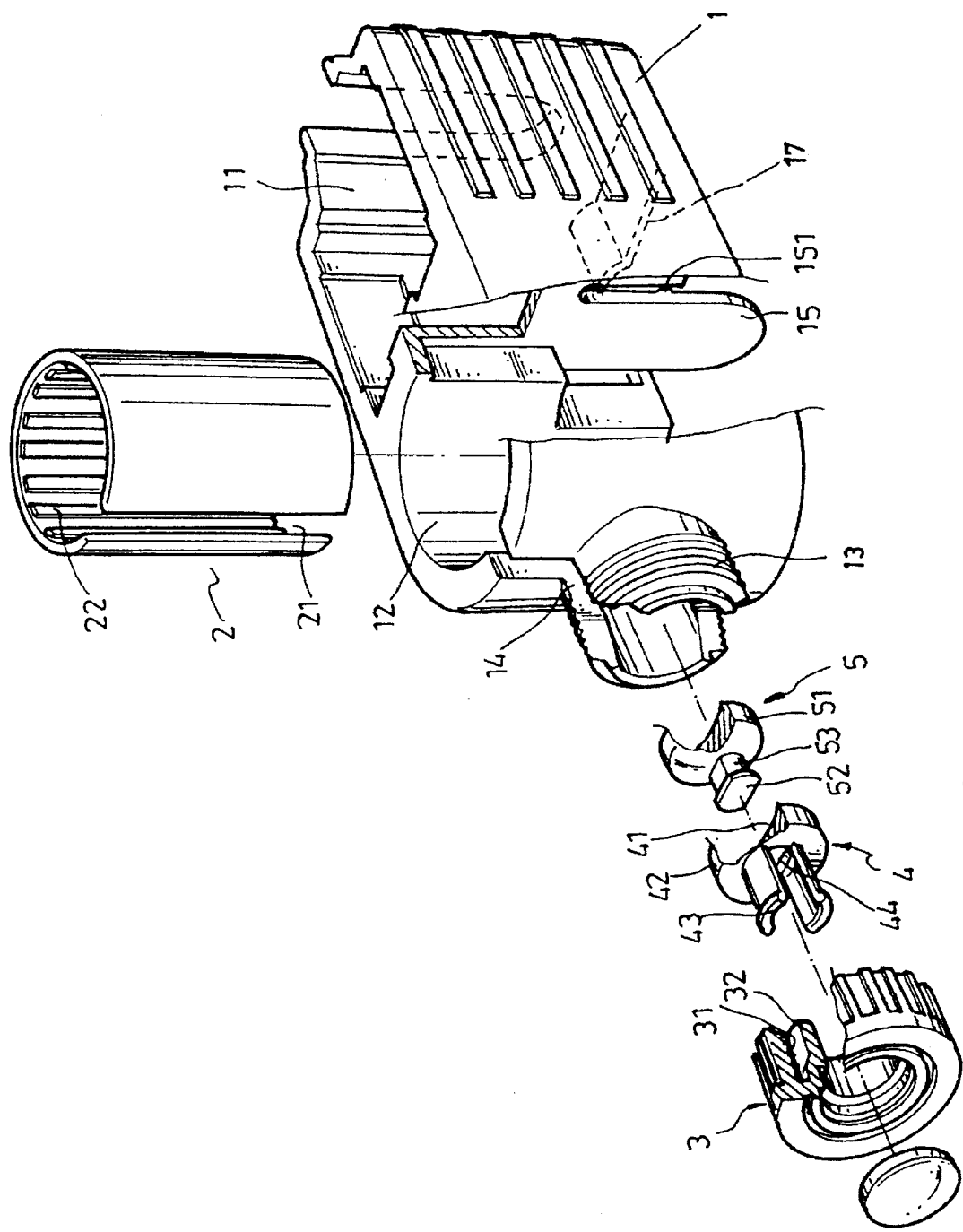
FIG. 2 is an exploded perspective view of the supporting bracket made according to the present invention.

Referring to FIGS. 1 and 2, the supporting bracket made according to this invention includes a bracket body 1 defining a lock receiving portion 11 and tube receiving portion 12. The tube receiving portion 12 has a split socket configuration. A threaded extension 13 is disposed at one side of said split socket 12. A slot 14 is defined from the center of said extension 13 to said split socket 12 thereof. A releasing plate 15 is disposed at the center of lock receiving portion 11. Said releasing plate 15 is provided with at least one retaining hook 151 Said lock receiving portion 11 further includes a stopping plate 16 at the bottom portion, as clearly shown in FIG. 3. A spring plate 17 is disposed at the bottom of said lock receiving portion 11.

A retaining bush 2 is disposed within said split socket 12 of said bracket body 1. Said retaining bush 2 has a split 21 and a plurality of retaining ribs 22 are provided at the inner wall of said bush 2.

A locking knob 3 is removably screwed onto said threaded portion 13 of said split socket 13. Said locking knob 3 has a nut configuration which has inner thread 31 thereof. Said locking knob 3 is provided with a inner tube 32 at its central portion.

An adaptor 4 is removably received with said inner tube 32 of said locking knob 3. Said adaptor 4 has a disk 42 with a concave surface 41. On the opposite end, a pair of hooking stems 43 are provided thereon. Said hooking stems 43 can be engaged with said inner tube 32 of said locking tube 3. A rectangular opening 44 is provided at the central portion of said disk 42.

A biasing block 5 is slidably received within said rectangular opening 44 of said adaptor 4. Said biasing block 5 has a double circular disk configuration 51. The convex side of said block 5 is provided with a stem 53 with an enlarged head 52. Said stem 53 can be received within said rectangular opening 44 of said adaptor 4.

Figure 6:
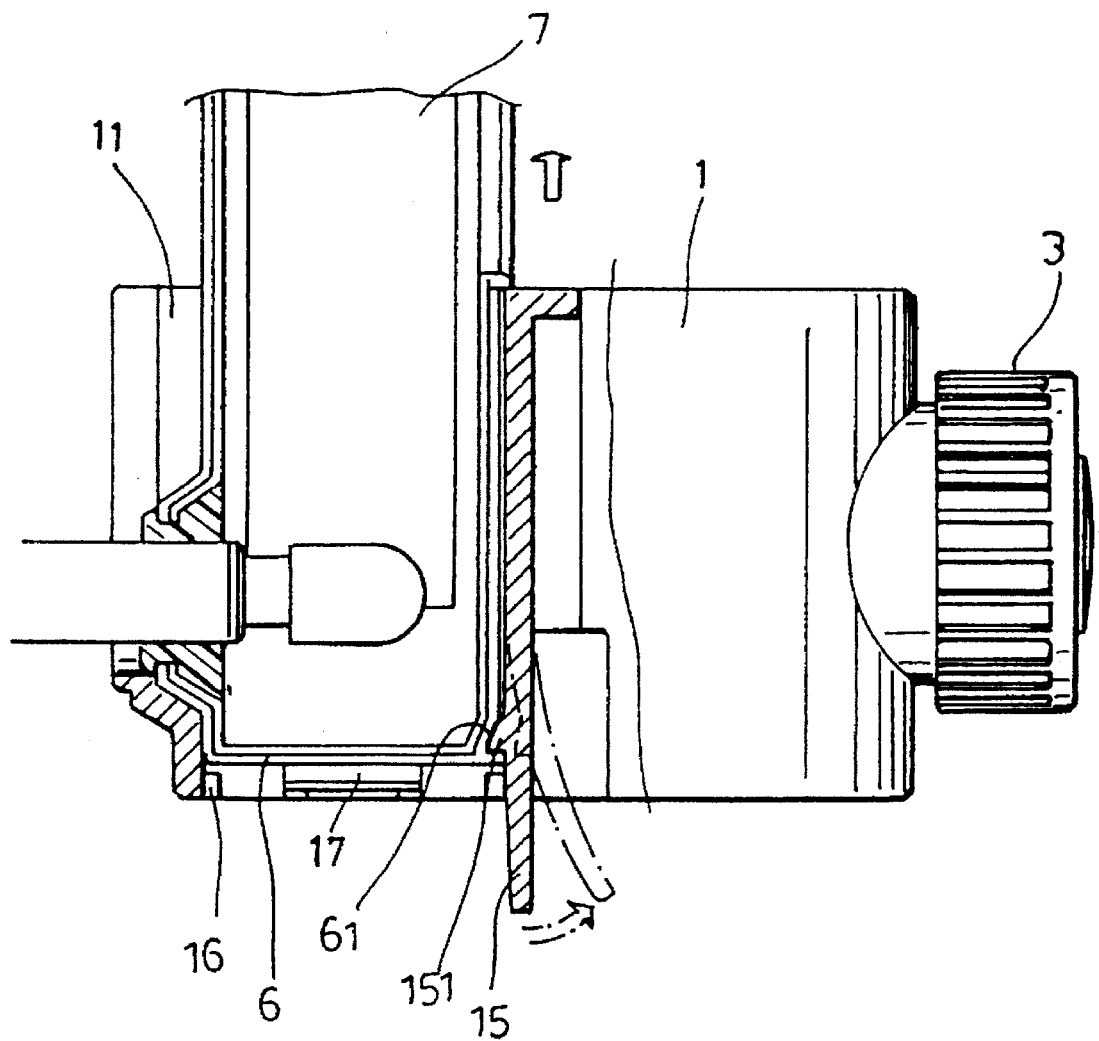
FIG. 6 is a sketch view showing a lock is rest on the supporting bracket made according to the present invention.

A covering lid 6 is covered onto the lock receiving portion 11 of said bracket body 1. Said covering lid 6 has a symmetric configuration which encloses the lock 7. A retaining hole 61 is provided at the lower portion of said covering lid 6. As shown in FIG. 6, said retaining hook 151 of said releasing spring 15 can be engaged with said retaining hole 61 of said covering lid 6.

Figure 3:
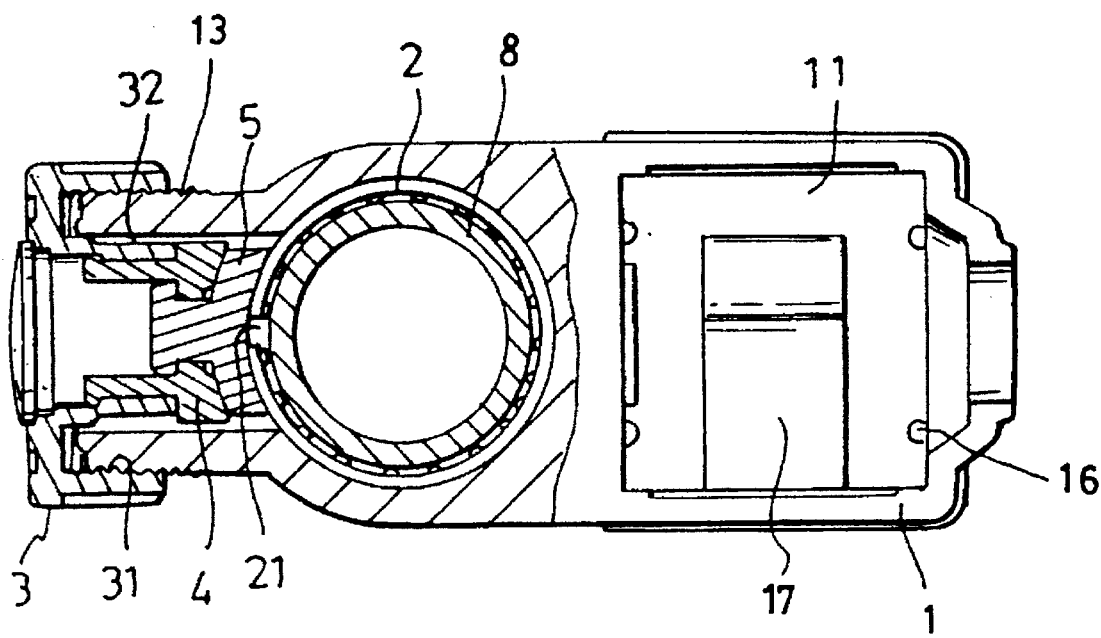
FIG. 3 is a top cross sectional view of the supporting bracket made according to the present invention.
Figure 4:
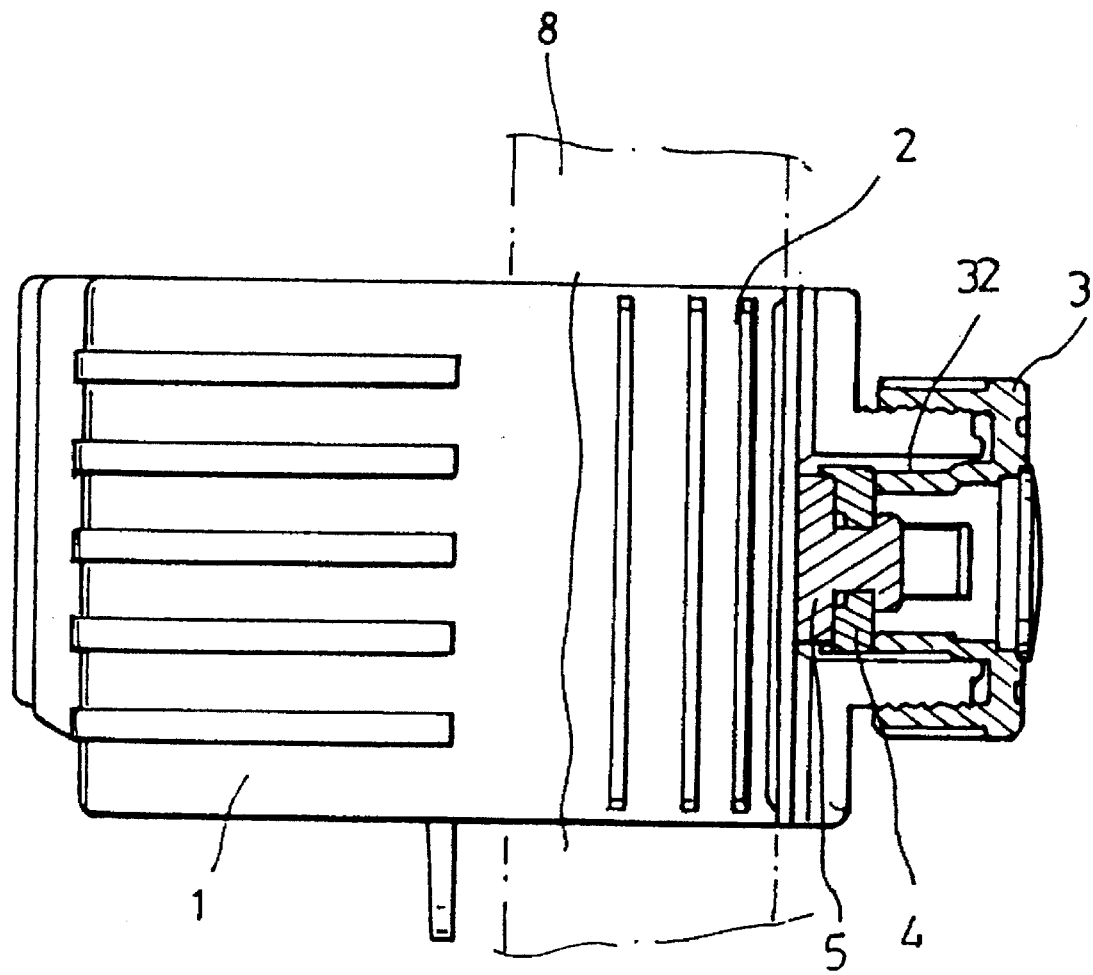
FIG. 4 is a side cross sectional view of the supporting bracket made according to the present invention.

Referring to FIGS. 3 and 4, said slot 14 of said split socket 12 of said bracket body 1 can be expanded to receive the tube 8 of the bicycle. On the other hand, said split socket 12 is provided with said bush 2 having a split 21 thereon. Accordingly, said bracket body 1 can be fixed to the tube 8 of the bicycle together with said bush 2. Then, said locking knob 3 is threaded onto said threaded extension 13 of said split socket 12. When said locking knob 13 is locked to a certain torque, said bracket body 1 is then firmly attached to the tube 8 of the bicycle.

The locking knob 3 is provided with said adaptor 4 and said biasing block 5 within said inner tube 32. When said locking knob 3 is screwed in, said biasing block 5 is moved close to said split socket 12. At last, said biasing block 5 will press against the outer wall of said bush 2. Since said bush 2 is provided with split 21, when said bush 2 is pressed by said biasing block 5, the inner diameter of said bush 2 is narrowed to enclose said tube 8 of the bicycle. By this arrangement, said bracket body 1 is firmly attached to the tube 8 of said bicycle. From the above description, it is apparent that no special tools are needed to install said bracket body 1. The inconvenience of conventional art is completely solved by the suggestion of the present invention.

Figure 5:
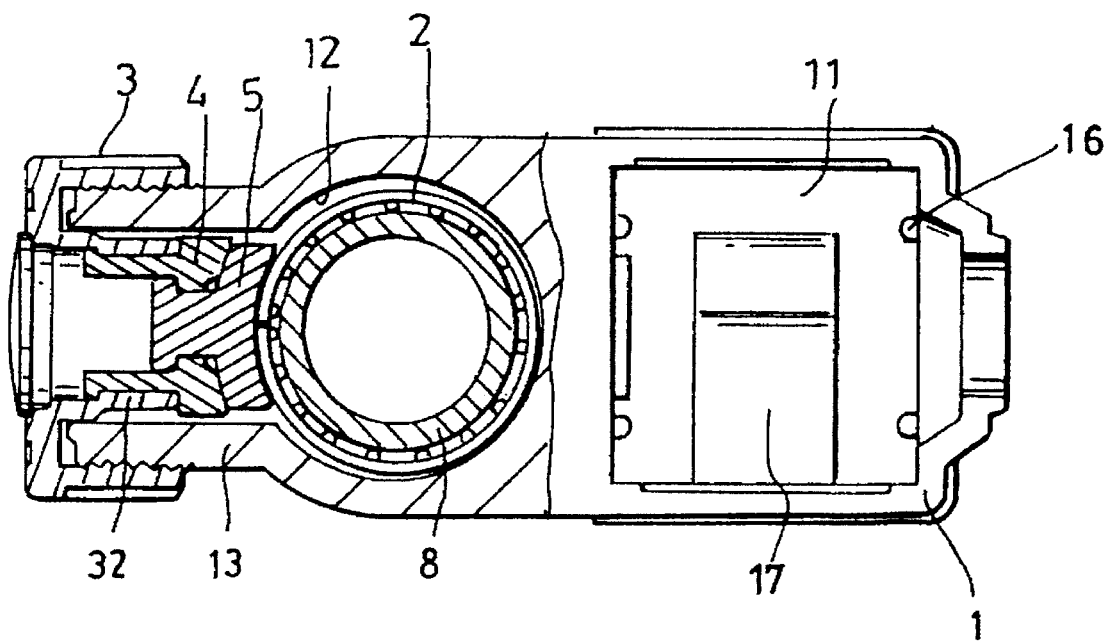
FIG. 5 is cross sectional view similar to FIG. 3 showing the bracket is fixed on a tube/of a bicycle.

Since the diameter of said tube 8 of the bicycle may be different from one brand to another, accordingly, said bush 2 can be applied to adapt it. On the other hand, when said locking knob 3 is screwed in, said biasing block is moved in to press said bush 2, consequently, said bush 2 will construct a firm engagement with said tube 8 of the bicycle, as shown in FIG. 5.

When said bracket body 1 is attached to the tube 8 of the bicycle, the lock 7 for bicycle can be held by said locking receiving portion 11. Besides, said lock 7 for bicycle is enclosed with covering lid 6, the lock can insert said locking receiving portion 11 via covering lid 6. Since the bottom of said locking receiving portion 11 is provided with a stopping plate 16 and said retaining hook 151 of said release spring 15 is engaged within said retaining hole 61 of said lid 6, accordingly, said lock 7 can readily insert into said bracket body 1, as clearly shown in FIG. 4.

When the rider hopes to use the lock to lock his bicycle, he shall first press down said releasing plate 15 to release said retaining hook 151 from said retaining hole 61 of said lid 6, then by the rebounding force from spring plate 17, said lock is biased upwardly. The rider can take off the lock 7 from the bracket 1, as clearly shown in FIG. 6.

Although the present invention has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. A supporting bracket for a lock for a bicycle including
a bracket body defining a lock receiving portion defining a cavity for receiving said bicycle lock and tube receiving portion, said tube receiving portion has a split socket configuration, a threaded extension being disposed at one side of said split socket, a slot being defined from the center of said extension to said split socket thereof, a releasing plate being disposed at the center of said lock receiving portion, said releasing plate being provided with at least one retaining hook, said lock receiving portion further including a stopping plate at the bottom portion, a spring plate being disposed at the bottom of said lock receiving portion;

a retaining bush being disposed within said split socket of said bracket body, said retaining bush having a split and a plurality of retaining ribs being provided at the inner wall of said bush;

a locking knob being removably screwed onto said threaded portion of said split socket, said locking knob having a nut configuration which has inner threads, said locking knob being provided with a inner tube at its central portion;

an adaptor being removably received within said inner tube of said locking knob, said adaptor having a disk with a concave surface, on the opposite end, a pair of hooking stems being provided thereon, said hooking stems be capable of engaging with said inner tube of said locking tube, a rectangular opening being provided at the central portion of said disk;

a biasing block being slidably received within said rectangular opening of said adaptor, said biasing block having a double circular disk configuration, the convex side of said block being provided with a stem with an enlarged head, said stem be received within said rectangular opening of said adaptor; and a covering lid being covered onto the lock receiving portion of said bracket body, said covering lid having a symmetric configuration which encloses the lock, a retaining hole being provided at the lower portion of said covering lid, said retaining hook of said releasing spring being engaged with said retaining hole of said covering lid.

2. A supporting bracket as recited in claim 1, wherein said covering lid is released by said releasing plate, accordingly, said lock is biased to move upward by said spring plate.

3. A supporting bracket as recited in claim 1, wherein said biasing block is moved by said locking knob, accordingly, said biasing block is pressed against said bush firmly to construct a strong engagement between said bush and said tube of said bicycle.

* * * * *